(12) United States Patent
Baluja et al.

(10) Patent No.: US 8,065,248 B1
(45) Date of Patent: *Nov. 22, 2011

(54) APPROXIMATE HASHING FUNCTIONS FOR FINDING SIMILAR CONTENT

(75) Inventors: Shumeet Baluja, Leesburg, VA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,484

(22) Filed: Oct. 21, 2010

Related U.S. Application Data

(63) Continuation of application No. 11/766,594, filed on Jun. 21, 2007, now Pat. No. 7,831,531.

(60) Provisional application No. 60/818,182, filed on Jun. 30, 2006, provisional application No. 60/816,197, filed on Jun. 22, 2006.

(51) Int. Cl.
*G06F 15/18* (2006.01)
*G06N 3/08* (2006.01)

(52) U.S. Cl. ....................................................... 706/25
(58) Field of Classification Search ...................... 706/25
See application file for complete search history.

(56) References Cited

U.S. PATENT DOCUMENTS

| | | | |
|---|---|---|---|
| 4,811,399 A | 3/1989 | Landell et al. |
| 5,706,364 A | 1/1998 | Kopec et al. |
| 6,023,693 A | 2/2000 | Masuoka et al. |
| 6,236,758 B1 | 5/2001 | Sodagar et al. |
| 6,494,720 B1 | 12/2002 | Meyrowitsch |
| 6,563,909 B2 | 5/2003 | Schmitz |
| 6,585,521 B1 | 7/2003 | Obrador |
| 6,704,920 B2 | 3/2004 | Brill et al. |
| 6,751,601 B2 | 6/2004 | Zegers |
| 6,763,339 B2 | 7/2004 | Fu et al. |
| 6,766,523 B2 | 7/2004 | Herley |
| 6,773,266 B1 | 8/2004 | Dornbush et al. |
| 6,782,186 B1 | 8/2004 | Covell et al. |
| 6,879,967 B1 | 4/2005 | Stork |
| 6,892,191 B1 | 5/2005 | Schaffer |
| 6,895,514 B1 | 5/2005 | Kermani |
| 6,944,632 B2 | 9/2005 | Stern |
| 7,103,801 B2 | 9/2006 | Marilly et al. |
| 7,107,207 B2 | 9/2006 | Goodman |
| 7,174,293 B2 | 2/2007 | Kenyon et al. |

(Continued)

FOREIGN PATENT DOCUMENTS

EP 1524857 A3 12/2005

OTHER PUBLICATIONS

'A Highly Robust Audio Fingerprinting System' [online]. Haitsma et al. 2002,[retrieved on Nov. 16, 2006]. Retrieved from the Internet: <URL: www.ismir2002.ismir.net/proceedings/02-FP04-2.pdf>, 9 pages.

(Continued)

*Primary Examiner* — Michael B Holmes
(74) *Attorney, Agent, or Firm* — Fish & Richardson P.C.

(57) ABSTRACT

A method including training a plurality of learning systems, each learning system implementing a learning function and having an input and producing an output, initializing one or more data structures, and evaluating a target sample is described. Also described are methods that include initializing one or more data structures and evaluating a target sample for a best match.

24 Claims, 7 Drawing Sheets

U.S. PATENT DOCUMENTS

| | | | |
|---|---|---|---|
| 7,266,492 | B2 | 9/2007 | Goodman |
| 7,281,219 | B2 | 10/2007 | Hamilton et al. |
| 7,375,304 | B2 | 5/2008 | Kainec et al. |
| 7,386,479 | B2 | 6/2008 | Mizuno |
| 7,472,096 | B2 | 12/2008 | Burges et al. |
| 7,617,164 | B2 | 11/2009 | Burges et al. |
| 7,831,531 | B1 * | 11/2010 | Baluja et al. ............... 706/25 |
| 2002/0133499 | A1 | 9/2002 | Ward et al. |
| 2003/0093790 | A1 | 5/2003 | Logan et al. |
| 2003/0101144 | A1 | 5/2003 | Moreno |
| 2004/0025174 | A1 | 2/2004 | Cerrato |
| 2004/0031058 | A1 | 2/2004 | Reisman |
| 2004/0128682 | A1 | 7/2004 | Liga et al. |
| 2004/0199387 | A1 | 10/2004 | Wang et al. |
| 2005/0066352 | A1 | 3/2005 | Herley |
| 2005/0086682 | A1 | 4/2005 | Burges et al. |
| 2005/0096920 | A1 | 5/2005 | Matz et al. |
| 2005/0147256 | A1 | 7/2005 | Peters et al. |
| 2005/0193016 | A1 | 9/2005 | Seet et al. |
| 2005/0283792 | A1 | 12/2005 | Swix et al. |
| 2006/0080356 | A1 | 4/2006 | Burges et al. |
| 2006/0174348 | A1 | 8/2006 | Rhoads et al. |
| 2007/0124756 | A1 | 5/2007 | Covell et al. |
| 2007/0130580 | A1 | 6/2007 | Covell et al. |
| 2007/0143778 | A1 | 6/2007 | Covell et al. |
| 2008/0090551 | A1 | 4/2008 | Gidron et al. |
| 2008/0263041 | A1 | 10/2008 | Cheung |

OTHER PUBLICATIONS

'A Review of Algorithms for Audio Fingerprinting' [online]. Cano et al., 2002, [retrieved on May 30, 2007]. Retrieved from the Internet: <URL: www.iua.upf.es/mtg/publications/MMSP-2002-pcano.pdf>, 5 pages.

Baluja et al., "Learning "Forgiving" Hash Functions: Algorithms & Large Scale Tests" Jun. 2006, 7 pages.

Burges et al "Using Audio Fingerprinting for Duplicate Detection and Thumbnail Generation," Mar. 2005, 4 pages.

'Computer Vision for Music Identification' [online]. Ke et al., 2005, [retrieved on May 30, 2007]. Retrieved from the Internet: <URL: www.cs.cmu.edu/~yke/musicretrieval/cvpr2005-mr.pdf>, 8 pages.

'CS276 Information Retrieval and Web Mining' [online]. Stanford, 2005, [retrieved on Nov. 16, 2006]. Retrieved from the Internet: <URL: www.stanford.edu/class/cs276/handouts/lecture19.pdf>, 8 pages.

'Data Mining: Associations' [online]. Stanford, 2002, [retrieved on May 30, 2007]. Retrieved from the Internet: <URL: www.stanford.edu/class/cs345a/pdf/cs345-Ish.pdf>, 61 pages.

'Duplicate Detection and Audio Thumbnails with Audio Fingerprinting' [online]. Burges et al. 2004, [retrieved on Nov. 21, 2006]. Retrieved on the Internet: <URL: www.research.microsoft.com/~cburges/tech_reports/tr-2004-19.pdf>, 5 pages.

'Fast Multiresolution Image Querying' [online]. Jacobs et al, 1995, [retrieved on Nov. 21, 2006]. Retrieved from the Internet: <URL: www.grail.cs.washington.edu/projects/query/mrquery.pdf>, 10 pages.

'Finding Interesting Associations without Support Pruning' [online]. Cohen et al. Retrieved from the Internet: <URL: www.dbis.informatik.hu-berlin.de/dbisold/lehre/WS0405/KDD/paper/CDFG_00.pdf> 12 pages.

'Shazam Entertainment Brings Music Recognition to Windows Mobile 5.0 Powered Smartphones' [online]. Shazam, 2006, [retrieved on Nov. 16, 2006]. Retrieved from the Internet: <URL: www.shazam.com/music/portal/sp/s/media-type/html/user/anon/page/default/template/pages/p/company_release30.html>, 1 page.

'Shazam Experience Music' [online]. [retrieved on May 30, 2007]. Retrieved from the Internet: <URL: www.shazam.com/music/portal/sp/s/media-type/html/user/anon/page/default/template/Myhome/music.html>, 2 pages.

Wang, "The Shazam Music Recognition Service," Communications of the ACM, Aug. 2006, 49(8): 5 pages.

'Wavelets for Computer Graphics: A Primer, Part 1' [online]. Stollnitz et al., 1995, [retrieved on Nov. 21, 2006]. Retrieved from the Internet: <URL: www.grail.cs.washington.edu/pub/stoll/wavelet1.pdf>, 8 pages.

'Wavelets for Computer Graphics: A Primer, Part 2' [online]. Stollnitz et al., 1995, [retrieved on Nov. 21, 2006]. Retrieved from the Internet: <URL: www.grail.cs.washington.edu/pub/stoll/wavelet2.pdf>, 9 pages.

Deller, Jr. et al., Discrete-Time Processing of Speech Signals 1-936 (Reprint ed. 1999).

Training neural networks with additive noise in the desired signal Chuan Wang; Principe, J.C.; Neural Networks, IEEE Transactions on vol. 10, Issue 6, Nov. 1999 pp. 1511-1517, Digital Object Identifier 10.1109/72.809097.

An information theoretic approach to adaptive system training using unlabeled data Kyu-Hwa Jeong; Jian-Wu Xu; Principe, J.C.; Neural Networks, 2005. IJCNN '05. Proceedings. 2005 IEEE International Joint Conference on vol. 1, Jul. 31-Aug. 4, 2005 pp. 191-195 vol. 1 Digital Object Identifier 10.11 09/1JCNN.2005.1555828.

Training neural networks with additive noise in the desired signal Chuan Wang; Principe, J.C.; Neural Networks Proceedings, 1998. IEEE World Congress on Computational Intelligence. The 1998 IEEE International Joint Conference on vol. 2, May 4-9, 1998 pp. 1084-1089 vol. 2 Digital Object Identifier 10.11 09/IJCNN.1998.685923.

Connectionist training of non-linear hidden Markov models for speech recognition Zhao, Z.; Neural Networks, 1991. 1991 IEEE International Joint Conference on Nov. 18-21, 1991 pp. 1647-1652 vol. 2, Digital Object Identifier 10.11 09/1JCNN.1991.170645.

"Community" definition. Oxford English Dictionary. Accessed Apr. 27, 2009. http://dictionary.oed.com/cgi/entry/50045241?single=1&query_type=word&queryword=community.

"Compression" definition. Oxford English Dictionary. Accessed Apr. 27, 2009. http://dictionary.oed.com/cgi/entry/50045890?single=1&query_type=word&queryword=compression.

"Database" definition. Oxford English Dictionary. Accessed Apr. 27, 2009. http://dictionary.oed.com/cgi/entry/50057772?single=1&query_type=word&queryword=database.

"Encrypt" definition. Oxford English Dictionary. Accessed Apr. 27, 2009. http://dictionary.oed.com/cgi/entry/00292459?single=1&query_type=word&queryword=encrypt.

International Preliminary Report on Patentability, Application No. PCT/US06/45549 mailed Jun. 12, 2008, 7 pages.

European Search Report, EP Application No. 08 15 3719 mailed Sep. 26, 2008, 8 pages.

International Preliminary Report on Patentability, Application No. PCT/US06/45551 mailed Apr. 2, 2009, 11 pages.

Gauch, J. M. et al., "Identification of New Commercials Using Repeated Video Sequence Detection," Sep. 11, 2005, Image Processing, 2005, ICIP 2005, IEEE International Conference on Genova, Italy Sep. 11-14, 2005, Piscataway, NJ, USA, IEEE, pp. 1252-1255.

PCT International Search Report for PCT/US2006/045549 dated Oct. 9, 2007, 10 pages.

PCT International Search Report for PCT/US2006/045551 dated Jul. 21, 2008, 20 pages.

Supplemental EP Search Report for EP Application No. 06838486.6 dated Feb. 16, 2010, 8 pages.

Supplemental EP Search Report for EP Application No. 06838488.2 dated Feb. 16, 2010, 8 pages.

Viola and Jones, "Robust Real-Time Object Detection," Int. J. Computer Vision, 2002, 25 pages.

Robust Technologies towards Automatic Speech Recognition in Car Noise Environments, Ding, P.; He, L.; Yan, X.; Zhao, R.; Hao, J.; Signal Processing, 2006 8th International Conference on vol. 1, Digital Object Identifier: 10.11 09/ICOSP.2006.345538 Publication Year: 2006.

Learning to Rank Using Semantic Features in Document Retrieval, Tian Weixin; Zhu Fuxi; Intelligent Systems, 2009. GCIS '09. WRI Global Congress on vol. 3 Digital Object Identifier: 10.11 09/GCIS.2009.148, Publication Year: 2009 , pp. 500-504.

Input Data Representation for Self-Organizing Map in Software Classification, Yuqing Lin; Huilin Ye; Knowledge Acquisition and Modeling, 2009. KAM '09. Second International Symposium on vol. 2, Digital Object Identifier: 10.11 09/KAM.2009.151 Publication Year: 2009 , pp. 350-353.

David A. Sadlier et al., "Automatic TV advertisement detection from MPEG bitstream," Pattern Recognition, vol. 35 (2002), Issue 12, pp. 2719-2726.

Cheng Yang, "MACS: Music Audio Characteristic Sequence Indexing for Similarity," Applications for Signal Processing to Audio and Acoustis, 2001 IEEE Workshop, Oct. 21-24, 2001, pp. 123-126.

Chinese Patent Office Action for Application No. 200680051559.0 dated Jan. 22, 2010, 14 pages.

On adaptive acquisition of language, Gorin, AL.; Levinson, S.E.; Miller, L.G.; Gertner, AN.; Ljolje, A; Goldman, E.R.; Acoustics, Speech, and Signal Processing, 1990. ICASSP-90., 1990 International Conference on Digital Object Identifier: 10.11 09/ICASSP. 1990.115784 Publication Year: 1990, pp. 601-604 vol. 1.

An adaptive function neural network (ADFUNN) for phrase recognition, Miao Kang; Palmer-Brown, D.; Neural Networks, 2005. IJCNN '05. Proceedings. 2005 IEEE International Joint Conference on vol. 1, Digital Object Identifier: 10.11 09/IJCNN.2005.1555898 Publication Year: 2005, pp. 593-597 vol. 1.

A Multi-layer ADaptive FUnction Neural Network (MADFUNN) for Analytical Function Recognition, Miao Kang; Palmer-Brown, D.; Neural Networks, 2006. IJCNN '06. International Joint Conference on Digital Object Identifier: 10.11 09/IJCNN.2006.246895 Publication Year: 2006, pp. 1784-1789.

An all-phoneme ergodic HMM for unsupervised speaker adaptation, Miyazawa, Y.; Acoustics, Speech, and Signal Processing, 1993. ICASSP-93., 1993 IEEE International Conference on vol. 2 Digital Object Identifier: 10.11 09/ICASSP.1993.319372, Publication Year: 1993, pp. 574-577 vol. 2.

* cited by examiner

APPROXIMATE HASHING FUNCTIONS FOR FINDING SIMILAR CONTENT

CROSS-REFERENCE TO RELATED APPLICATIONS

This application is a continuation (and claims the benefit of priority under 35 USC 120) of U.S. application Ser. No. 11/766,594, filed Jun. 21, 2007, now U.S. Pat. No. 7,831,531, and claims the benefit under 35 U.S.C. §119 of the filing dates of U.S. Provisional Application No. 60/818,182, filed Jun. 30, 2006, and U.S. Provisional Application No. 60/816,197, filed Jun. 22, 2006. The disclosures of the prior applications are considered part of (and are incorporated by reference in) the disclosure of this application.

BACKGROUND

The advent of highly distributable, high volume data storage has allowed for the storage of vast amounts of information on a variety of topics and in a variety of forms such as text, images, music, and videos.

The problem of efficiently finding similar items in a large corpus of high-dimensional data points arises in many real-world tasks, such as music, image, and video retrieval. Beyond the scaling difficulties that arise with lookups in large data sets, the complexity in these domains is exacerbated by an imprecise definition of similarity.

SUMMARY

There exists a need to retrieve similar audio, image and video data from extensive corpuses of data. The large number of elements in the corpuses, the high dimensionality of the points, and the imprecise nature of "similar" make this task challenging in real world systems.

In one aspect, a method is described that includes training a plurality of learning systems, each learning system implementing a learning function and having an input and producing an output, initializing one or more data structures, and evaluating a target sample. Training a plurality of learning systems includes identifying a training set including target output values associated therewith, providing the training set to each learning system in a small number of plurality of cycles and adjusting parameters of the learning system to improve matching to the target output values, adjusting the target output values based on the actual output provided by the respective learning system, and continuing training the learning system. Initializing one or more data structures includes providing samples to each trained learning system, combining outputs of the learning systems for each sample, and mapping the combined outputs to one or more data structures, the combined outputs providing an indices to a respective sample in those data structures. Evaluating a target sample includes providing the target sample to each trained learning system, combining the outputs of the trained learning systems, and locating matching samples in the one or more data structures using the combined outputs of the trained learning system for the target sample.

The training set, samples, and target sample may be audio samples.

The learning systems may be neural networks. Each learning system may be seeded with a different seed. Combining outputs may include concatenating outputs. The training steps of providing, adjusting, and continuing may be repeated a plurality of times. The training step of identifying a training set may include identifying different training sets for at least two of the learning systems. The small number of cycles may be substantially 10.

Adjusting the target outputs may include evaluating actual learning system outputs and adjusting the target output for at least one sample to reflect at least one actual output.

Initializing the data structure may include providing corpus samples to the learning systems to classify each sample in the corpus. Initializing the data structure may include providing corpus samples to the learning systems and placing each sample in the data structure in accordance with the output provided by the learning systems.

Combining outputs may include selecting a subset of output values associated with one or more learning systems as representative of the combined output. Combining outputs may include determining least correlated bits to form the subset. Combining outputs may include selecting a second subset of output values associated with the one or more learning system as representative of the combined output and creating a second data structure where the combined bits from the second subset are an index to samples in the second data structure. Evaluating a target sample may include selecting first and/or second subsets of output values as representative of the target sample.

In another aspect, a method is described that includes initializing a data structure including mapping samples that are to be included as entries in the data structure to locations in the data structure using a plurality of learning systems, and evaluating a target sample for a best match to a sample in the data structure including using an index system created using the plurality of learning systems to locate a match in the data structure.

In another aspect, a method is described that includes initializing one or more data structures including mapping samples that are to be included as entries in the data structure to locations in the data structure using a plurality of learning systems, where initializing includes training each learning system using a training set and target output values, adjusting the target output values based on the actual output of the respective learning system, and continuing to train the respective learning system, and evaluating a target sample for a best match to a sample in the data structure including providing the target sample to the plurality of learning systems, and using the output therefrom to determine a best match in the data structure.

In another aspect, a method is described that includes initializing a data structure including mapping samples that are to be included as entries in the data structure to locations in the data structure using a plurality of learning systems, and evaluating a target sample for a best match to the samples in the data structure including using the learning systems to locate a match in the data structure without directly comparing the target sample to the data structure sample.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
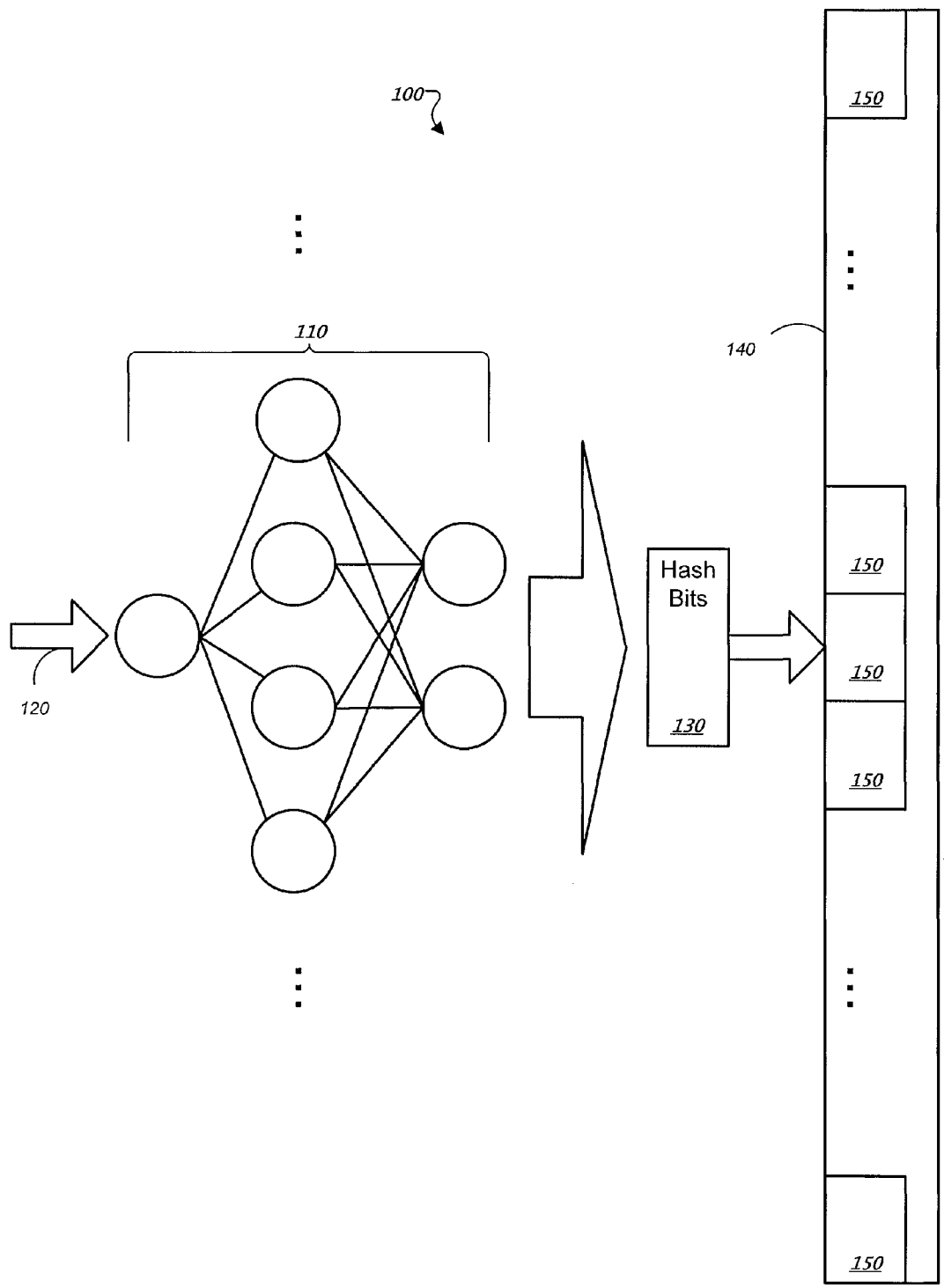
FIG. 1 is a block diagram illustrating an exemplary architecture for locating matching samples using a learning system.

FIG. 1 is a block diagram illustrating an exemplary architecture 100 locating matching samples using a learning system.

The architecture 100 will be described in reference to a data processing system that implements a method to learn a similarity function from weakly labeled positive examples for use in, for example, audio retrieval. Other applicable areas include, but are not limited to, image or video retrieval. Once learned, the similarity function may be used as the basis of one or more hash functions to constrain the number of data points considered during a retrieval or comparison operation. To increase efficiency, no comparisons in the original high-dimensional space of points are required. Generally stated, the architecture will learn how to retrieve examples from a database that are similar to a probe sample in a manner that is both efficient and compact.

In general, machine learning attempts to correctly deduce a function $f$ such that $f(X)=Y$, where X is an input and Y is an output. In many cases X or Y is unknown or loosely known. Examples of machine learning include, supervised learning, unsupervised learning, and reinforced learning. Learning can be accomplished by a neural network or other such learning systems.

One or more neural networks, such as the neural network represented by brace 110, may be used to sort samples. The neural network receives input 120 based on an audio-spectrogram, and outputs hash bits 130. Hash bits 130 may be used to specify a bin location such as bin locations 150, of one or more hash tables 140. The number of hash tables 140 and bin locations 150 may be any number. After proper training, the bin location 150 calculated by the neural network 110 will specify a bin location where similar audio-spectrograms are located.

A neural network 110 is one example of a learning system that can be used in the architecture 100. For the purposes of these discussions, a neural network is a digital construct that is a collection of units and weights. Generally, a neural network defines a non-linear function approximation tool that is very loosely based on neural networks in the brain. Inputs are generated from a sample, and passed to input units or 'neurons.' In one implementation, each input 'neuron' is connected via a directed connection to some number of hidden units in hidden-layerA, in hidden-layerB, etc., or directly to the outputs. There can be any number of hidden units and hidden layers. In turn, each neuron in hidden-layerA can be connected to neurons in hidden-layerB, etc., or in the outputs. In general, in a feed-forward networks (as can be used here), neurons are connected by weighted connections to neurons in layers deeper in the network. Units can be connected in various ways, such as fully connected, sporadically connected, or just connected to certain layers, etc. Generally, units are connected to each other very specifically, where each connection has an individual weight. In one implementation, each unit or neuron generates an output signal when it is activated. In one implementation, each connection has a weight associated with it. In one implementation, the stronger the weight, the stronger the from-neuron's activation will affect the to-neuron's activation.

Through the connections between neurons, the output of one unit can influence the activations of other units. The unit receiving an activation signal calculates its own activation by, for example, taking a weighted sum of the input signals. In one implementation, each neuron beyond the input layer performs a simple function: for each of its connections, it multiplies the weight of the connection with the activation of the neuron to which it was connected, and it then sums these values. The value is then passed through a function (usually non-linear) such as 1/tan h. This then becomes that neuron's activation. Typically, if the unit's activation is above some threshold, it will generate an output sending it, by way of its weighted connections, to the other units that it is connected to. This same process occurs in neurons throughout the neural network, until finally the output neurons perform.

Networks learn by changing the weights of the connections over training iterations, also know as epochs. The weights of the connections may be modified to minimize the error between the predicted outputs and the target outputs for each training example. For example, these weights may be modified through a gradient-descent procedure, or other procedure. There are a myriad of training techniques, such as back propogation, which can be used to generate a response throughout the neural network 110. For example, a neural network may be used to develop a hashing function to categorize audio snippets.

The network may learn from various inputs. For example, the system may receive audio samples produced by splitting songs into slices. In one implementation, slices are chosen such that they do not completely overlap. Slices can be of any length and taken from any part of the song. In one implementation, each slice is also assigned a song label for the purposes of classifying the slice. Songs can be received from a song database, or through some other mechanism, such as being sent to the system via a user interface.

Using the number of sample songs and the number of hash bins 150 of the one or more hash tables 140, the system calculates a total number of possible hash bits 130. The system assigns the song slices an output from the calculated set of bits. This initial value is used to begin the training process and may or may not be the final value of the hash bits 130 for the song slice.

In one implementation, training may be accomplished by selecting a number of snippets from a number of songs (for example, selecting 10 consecutive 1.4 second long snippets from 1024 songs, sampled 110 milliseconds apart for a total of 10,240 song snippets). In one implementation, each snippet from the same song is labeled with the same song code (i.e. forced to the same output bin). In one implementation, to start, the target output for each song is assigned randomly, chosen without replacements from P(S), where S is 10 bits, for example. Put another way, each song is assigned a different set of 10 bits and P(S) is the power set, containing $2^{10}$ different sets of 10 bits. Over time, the target outputs may change as the neural network 110 is trained.

In some implementations, the neural network 110 learns to map similar songs closer together in the hash tables 140. The neural network also learns to map dissimilar songs farther apart.

In one implementation, measured over the training set of 10,240 snippets, the target outputs will have maximal entropy; each binary output will be targeted as "on" for exactly 50% of the samples. In one implementation, the target outputs shift throughout training. After every few epochs of weight updates, the neural network's response to each training sample is measured.

The target outputs of each sample are then dynamically reassigned to the member from P(S) that is closest to the aggregate response of the network to each of the song's snippets. In one implementation, during the dynamic reassignment, two constraints are maintained: each song's snippets must have the same output, and each output from P(S) must be assigned only once.

Training of the neural network 100 can be summarized by the following table:

TABLE 1

SELECT M=$2^n$ songs and DEFINE B(t) = $t^{th}$ binary code
FOREACH (song $S_m$)
 | FOR ($X_m$ iterations ) { ADD snippet $S_{m,x}$ to training set }
 | SELECT target $T_m \in \{0,1\}^n$ s.t. $T_{m1} = T_{m2}$ $m_1 = m_2$
FOR ($I_{dyn}$ iterations)
 | TRAIN network for $E_{dyn}$ epochs ($E_{dyn}$ passes through data)
 | FOREACH (song $S_m$)
 |  | SET $A_m = \Sigma_{x \in X_m} O(S_{m,x}) / X_m$
 |  | (where $O(S_{m,x})$ = actual network output for snippet $S_{m,x}$)
 | SET $U_t = \{ t \mid 0 < t \leq M\}$ as the unassigned binary codes
 | SET $U_s = \{s \mid 0 < s \leq M \}$ as the unassigned songs
 | FOR (M iterations)
 |  | FIND (s, t) = arg $min_{s \in U_s, t \in U_t} \| B(t) - A_s \|_2$
 |  | SET $T_s = B(t)$
 |  | REMOVE s from $U_s$ and REMOVE t from $U_t$
TRAIN network for $E_{fixed}$ epochs
Settings used:
n=10 M=1024, $X_m$ =10 ($\forall$m), $E_{dyn}$ =10, $I_{dyn}$ =50, $E_{fixed}$=500

In Table 1, n, m, $X_m$, $E_{dyn}$, $I_{dyn}$, and $Ef_{ixed}$, can be of any value which matches the configuration parameters of the system. For example, in one implementation, n=10, M=1024, $X_m$=10 ($\forall$ m), $E_{dyn}$=10, $I_{dyn}$=50, $E_{fixed}$=500.

By allowing the neural network 110 to adapt the outputs as described above, the outputs across training examples can be effectively reordered to prevent forcing artificial distinctions. Through the reordering process, the outputs are effectively reordered to create a weak clustering of songs. Similar songs are likely to have small hamming distances in target outputs. A hamming distance is a value that defines the number of changes necessary to represent one value (e.g., a binary representation of a number, or a string) as another value. For example, the binary values 100000 and 100011 would have a hamming distance of 2.

In some implementations, more than one neural network 110 may be used to determine the hash bits 130. The overall system can use any or all of a neural network's output when constructing the set of hash bits 130. The outputs of the neural networks 110 can be combined into a single output of hash bits 130. Using the outputs from many, separately trained, neural networks 110, the system can improve performance by decreasing the number of look-ups required while avoiding the computation costs associated with training larger neural networks. Put another way, using many smaller neural networks to mimic the behavior of a larger one can yield improved performance.

When the system uses more outputs to construct the hash bits 130, the number of bins grows in size. For example, 10 bits for the has bits yields 1024 unique bins, while 22 bits for the hash bits 130 yields 4,194,304 unique bins.

The system can select from the unused outputs of the neural network 110 ensemble to build another hash function that indexes into another hash table. When a new query arrives, it is passed through all of the networks and the outputs of the networks, if they have been selected into one of L hash tables, are used to determine the bin location 150 of that hash table 140.

Figure 2:
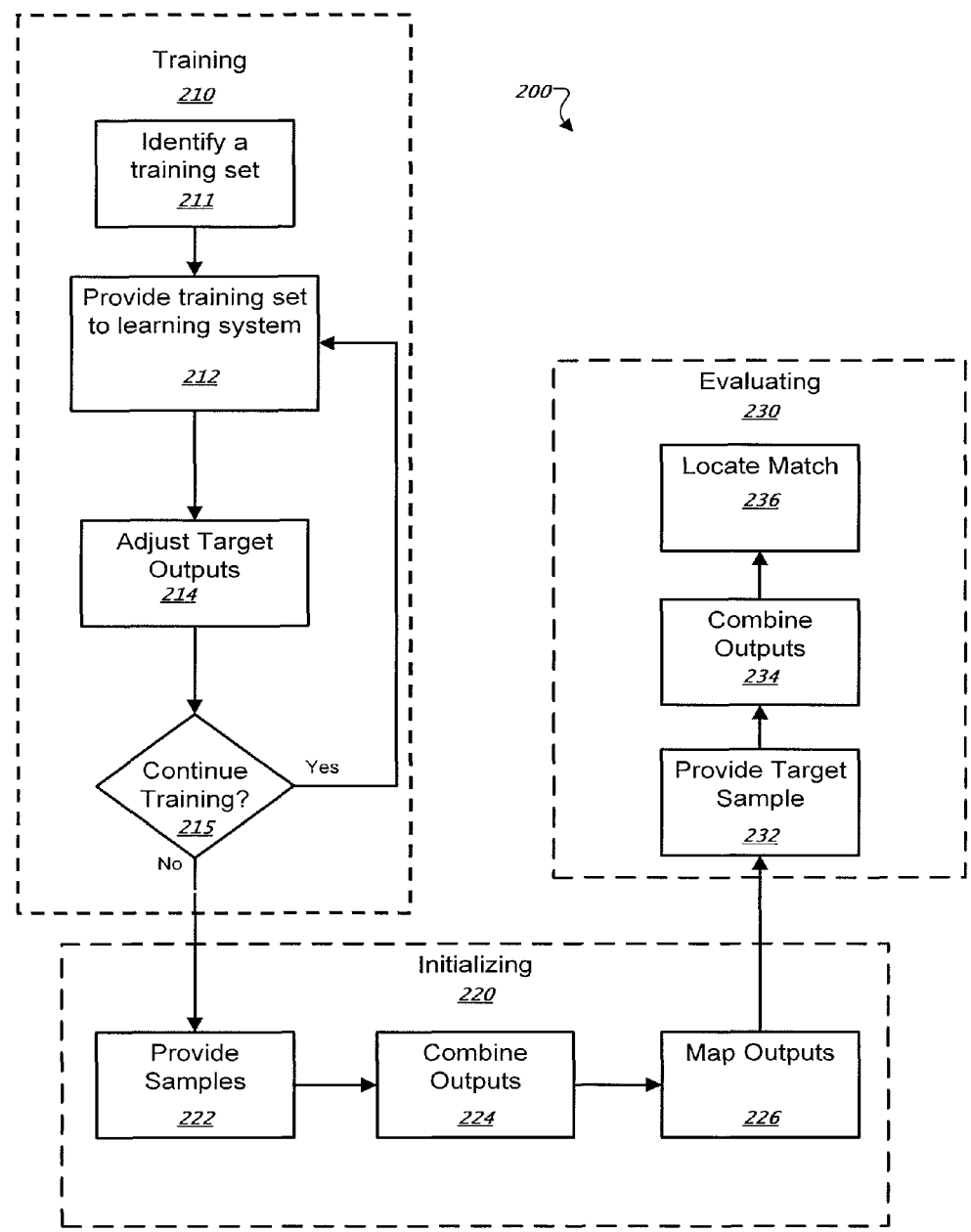
FIG. 2 is a flow chart illustrating one method 200 for training, initializing, and using a neural network 110 to find similarities in data.

FIG. 2 is a flow chart illustrating one method 200 for training, initializing, and using a neural network 110 to find similarities in data.

The method 200 includes training (step 210) one or more learning systems. The trained learning systems can then be initialized (step 220) using appropriate samples. The trained and initialized systems may then be used to evaluate (step 230) data, such as new song snippets to determine similarity between songs or song snippets.

The method 200 includes training a system 210. Initially, a training set is identified 211. The training set is then provided to the learning systems 212. The learning system may include one or more systems. For example, learning can be accomplished by one or more neural networks or other learning systems.

The learning systems are provided with the training set of data, and the data is provided with a starting target value. As an example, this may be accomplished by randomly assigning a song snippet a 10 bit value, and forcing the value to be the same across the samples having the same desired output (i.e. all song snippets from the same song). The learning systems are then trained in a conventional manner, for example, where a song snippet is passed to the neural network and is processed.

Through processing the song snippet, the neural network 110 can modify the weights of its connectors. After a certain amount of training, the results can be examined and evaluated, and the target outputs adjusted or reassigned (step 214). For example, when using a neural network, the results may be examined after a predetermined number of training epochs (e.g., 10). In the examination, the results are compared against expected or desired results. For example, a neural network system may dynamically reassign the outputs to an aggregate value based on the results of the evaluation. Over time, this results in more similar samples being grouped closer together. Implicit distance may be measured by an average hamming distance, total hamming, or other measure.

In one implementation, one or more neural networks may be used as the learning systems. A deterministic hash function maps the same point to the same bin. These methods create a hash function that also groups "similar" points in the same bin, where "similar" is defined by the task. This may be described as a forgiving hash function, in that it forgives differences that are small with respect to the implicit distance function being calculated.

Learning a forgiving hash function has several objectives: (1) function without an explicitly defined distance metric; (2) work with only weakly labeled examples, because although there are some indications of what points are similar (such as the song label), there is no information about which parts of songs sound similar to other parts; and (3) generalize beyond the examples given, as it cannot be trained on samples from all the songs that will be expected to be used with. Effectively, this means that the learned function must maintain entropy in the hashes for even new samples. Whether or not the songs have been seen before, they must be well distributed across the hash bins. If the entropy is not maintained, the points (samples) may be hashed to a small number of bins, rendering the hash ineffective.

In training, the entropy may be explicitly controlled by carefully setting the outputs of the training examples. Other learning methods may also be used, for example, controlling entropy of each output, and also between outputs (to ensure that they are not correlated). Furthermore, incremental training of a network also provides the opportunity to dynamically set the target outputs to minimize the artificial distinctions between similar sounding, but different, songs.

A neural network may be trained to take as input an audio-spectrogram and output a bin location where similar audio-spectrograms have been hashed. The outputs of the neural network may be represented in binary notation.

One difficulty in training arises in finding suitable target outputs for each network. In one implementation, every snippet of a particular song is labeled with the same target output. The target output for each song can be assigned randomly, chosen without replacement from P(S), where S is 10 bits—i.e., each song is assigned a different set of 10 bits and P(S) is the power set, containing $2^{10}$ different sets of 10 bits. Sampling without replacement may be used as a component of this procedure. Measured over the training set, the target outputs will have maximal entropy: each binary output will be targeted as 'on' for exactly 50% of the samples.

Instead of statically assigning the outputs, in one implementation the target outputs shift throughout training. This approach overcomes the potential drawback of large hamming distances while retaining the benefit of not hindering/preventing the mapping. Thus, in one implementation, after every few epochs of weight updates, the network's response to each of the training samples is measured. The target outputs of all of the samples are then dynamically reassigned to the member from P(S) that is closest to the aggregate response of the network to each of the song's snippets. However, in this implementation, two constraints are maintained: each song's snippets must have the same output; and each output set from P(S) must be assigned once (no two song's snippets can have the same target outputs). This is a suitable approach, as the specific outputs of the network are not of interest, only the distribution of them (to maintain high entropy), and that similar snippets map to the same outputs.

By letting the network adapt the outputs in this manner, the outputs across training examples can be effectively reordered to prevent forcing artificial distinctions. Through this process, the outputs are effectively being reordered to perform a weak form of clustering of songs: similar songs are likely to have small hamming distances in target outputs.

In one implementation, a learning function may be created using only weakly labeled positive examples (similar pairs) coupled with a forced constraint towards maximum entropy (nearly uniform occupancy). Negative examples (dissimilar pairs) are not explicitly created, but instead the methods rely on a maximum-entropy constraint to provide separation. Such an approach attempts to explicitly learn the similarities and use them to guide the hash function. Furthermore, this approach allows similarity to be calculated on (potentially non-linear) transformations of the input rather than directly on the inputs. In addition, the use of multiple hashes (or multiple networks) in the system may be used to account for the imperfect learning of a difficult similarity functions. These learning systems would have the advantage of allowing for similarities between only nominally distinct samples, without requiring the learning structure to attempt to discover minor (or non-existent) differences in these close examples.

This approach attempts to explicitly learn the similarities and use them to guide the hash function. Furthermore, this approach allows similarity to be calculated on (potentially non-linear) transformations of the input rather than directly on the inputs. The use of multiple hashes in the system used here is to account for the imperfect learning of a difficult similarity functions.

Two of the metrics that may be used to measure performance of a network's outputs include: 1) the number of elements hashed to each bin (how many candidates must be considered at each lookup); and 2) the number of similar elements that are hashed to each bin (is there a snippet from the correct song in the bin when a lookup is done?). Various criterion may be used for measurement purposes, such as the likelihood of the correct snippet in the correct bin. For example, a simple recall criterion can be used for measurement purposes: of the snippets in the hashed bin, are any from the correct song? For example, a more stringent recall criterion can be whether there is a correct match with the song label associated with the single top-ranked snippet and a query.

A large-scale hashing system can be created to increase the number of bins. One implementation to scale the hash to a larger number of bins would be to train the network with more outputs. For example, a network trained with 10 outputs allows 1024 bins in the hash, while using 22 bits for the hash bits yields 4,194,304 bins in the hash. However, using larger networks necessitates more training data, and thus the approach can become computationally prohibitive.

In an alternative implementation, the system can leverage the facts that training networks is a randomized process dependent on the initial weights, and that networks with different architectures typically learn different mappings. Therefore, the outputs of multiple networks may be combined to create a large-scale hashing system. For example, multiple networks may be trained, and bits for the hash may be selected from any of the networks' outputs. Numerous methods can be used to select which outputs are used for a hash. For example, various methods of selecting the outputs include random selection, using sets with minimum correlation between the members, and using sets with minimum mutual information. The selection may be made in a greedy manner, or other manner. The methods that account for mutual information generally explicitly attempt to place the points across bins by ensuring that the combined entropy of the bits that compose the hash index remains high. For example, the outputs of more than one neural network can be concatenated to produce a set of hash bits. The hash bits can come from any output any neural network and not all neural networks need to be represented in the concatenated result. More than one neural network can also be combined by looking at the outputs and determining a correlation between the outputs bits. The system can use the correlation of bits to determine the set of bits used as hash bits. In one implementation, the system can look at the least correlated bits and use these least correlated bits as representative bits of the output.

Using an approach of combining the results of different networks allows for selection of an arbitrary number of outputs from the network ensemble for the hash function. This allows much greater freedom that the constraint of using only a number of bits equal to the output of a single network (for example, 10 bits in a single 10 output network).

The performance of a neural network can be measured in terms of lookups and correct matches as a function of bits that are used for the hash. By selecting the hash bits from multiple networks, the number of lookups when using the same number of bins (such as 1024) can be decreased. For example, in one implementation, selecting hash bits from multiple neural networks, decreased the number of lookups for 1024 bins by a factor of substantially 50%. The lookups were reduced from 200 per query when using 10 outputs from a single neural network to 90 lookups per query when using 10 outputs from more than one neural network in one exemplary system. In another implementation, increasing the number of bins both decreased the number of correct matches and decreased the number of lookups. However the number of lookups decreased (from 90 to 5 per query, a 94% reduction) more than the decrease in correct matches (approx. 50%), when going from 1024 bins to 4,194,304 bins in one exemplary implementation.

The learning systems can be trained in this fashion until the learning systems are determined (step 215) to be trained. This may be accomplished by meeting a predetermined accuracy threshold (such as exceeding an 80% correctness rate), by being trained a certain amount of time, or another measure. Once properly trained, the learning systems can be used to generate information to specify locations for the data. For example, in on implementation, a neural network may be trained for 1000 epochs, with the outputs evaluated and reassigned every 10 epochs. After these 1000 epochs, the neural network is considered trained.

After training, the data structures may be initialized. In some implementations, training the system also results in initialized data structures.

The method 200 may initialize (step 220) the data structures by providing (step 222) sample snippets for processing by the one or more learning systems. For each sample processed, the system can combine (step 224) one or more outputs from one or more learning systems. Using the combined outputs, the system can map (step 226) the outputs from one or more learning systems, providing indices to the samples provided. For example, the data structures may be initialized by populating with audio snippets from a database of songs.

The system can begin evaluation (step 230) of a target sample by being provided (step 232) the target sample. For example, the target sample may be a song snippet from such sources as a database or as specified by a user through a user interface. The sample is then input into one or more trained learning systems which generate output. The system can combine (234) the outputs from one or more learning systems into an index. Using the combined index, the system can locate (step 236) a matching sample in one or more indexed locations.

In one implementation, one or more neural networks may be used as the learning systems. One approach is that when a new query, q, arrives, it may be passed into an ensemble of networks from which select outputs may be used to determine a single hash location in a single hash table. However, this can be generalized to q hash tables, with L distinct hash functions. In one implementation, this may be accomplished by selecting from the unused outputs of the network ensemble to build another hash function that indexes into another hash table. Thus, for other approaches, when q arrives, it may be passed through all of the networks and the outputs of the networks (if they have been selected into one of L hashes) are used to determine the bin of that hash.

As can be understood from the description above, comparisons are not required to be performed in the original high dimensional spectrogram representation of the target sample. After passing through the networks; the sample snippet is reduced to the quantized binary outputs, and the original representation is not needed for comparison.

In general, a smaller number of bins will yield a larger number of candidate lookups for any number of networks used. Thus, as would be expected, as the number of bins increases, the number of candidates decreases rapidly for settings of L. In addition, for larger numbers of networks used, the ability to find the best match in one implementation barely decreases as the number of bins increases—despite the large drop in the number of lookups. One exception to this is that for very small numbers of networks used (such as 1-3), as the number of bins increases, the accuracy rises (though remaining below the accuracy of larger number of networks). The increase occurs because there are a large number of ties when using a small L, as many songs have the same support, and ties are generally by random selection. In general, however, as the number of snippets hashed to the same bin decreases, the correct song competes with fewer incorrect ties and has a higher chance of selection.

In one implementation, as the number of hashes increases, the number of candidates generally increases almost linearly. This indicates that the hashes are truly independent. If they were not independent, the number of unique candidates examined would overlap to a much greater degree. Thus, if there was significant repetition of candidates across the hashes, we would see the same "frequent-tie" phenomena described for L=1-3: the same songs would be repeatedly grouped and we would be unable to distinguish the correct co-occurrences from the accidental ones.

For music identification, the hashing scheme may be incorporated into existing systems that identify songs with large snippets (i.e. 10-30 seconds) by simply integrating evidence over time. The system may designed to work with video and images as well.

Figure 3:
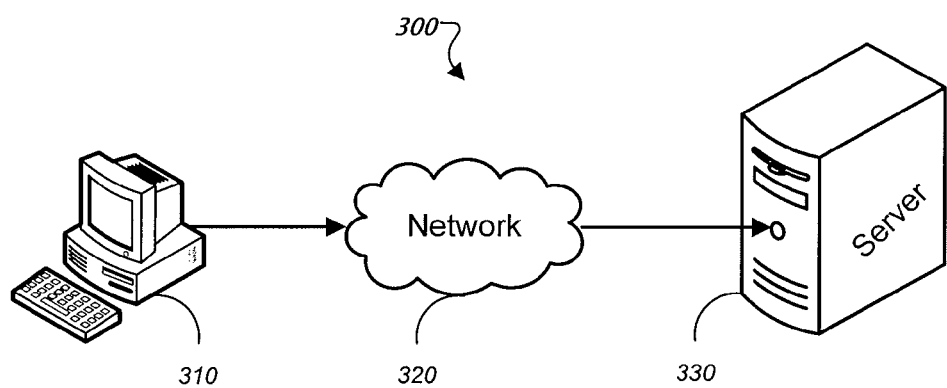
FIG. 3 is a schematic diagram illustrating an example system 300.

FIG. 3 is a schematic diagram illustrating an example system 300.

The example system 300 includes a client machine 310, a network 320, and one or more servers 330. The client machine 310 can send data, such as a song or song snippet, through the network 320 to one or more servers 330. The servers 330 can process the data, as described above, and can return results to the client 310 through the network 320. For example, if the data encompasses a song snippet, the servers 330 can return a list of one or more songs that may be the matching song. If the data encompasses a song, the servers 330 can, for example, return a list of one or more songs that sound similar to the original song.

Figure 4:
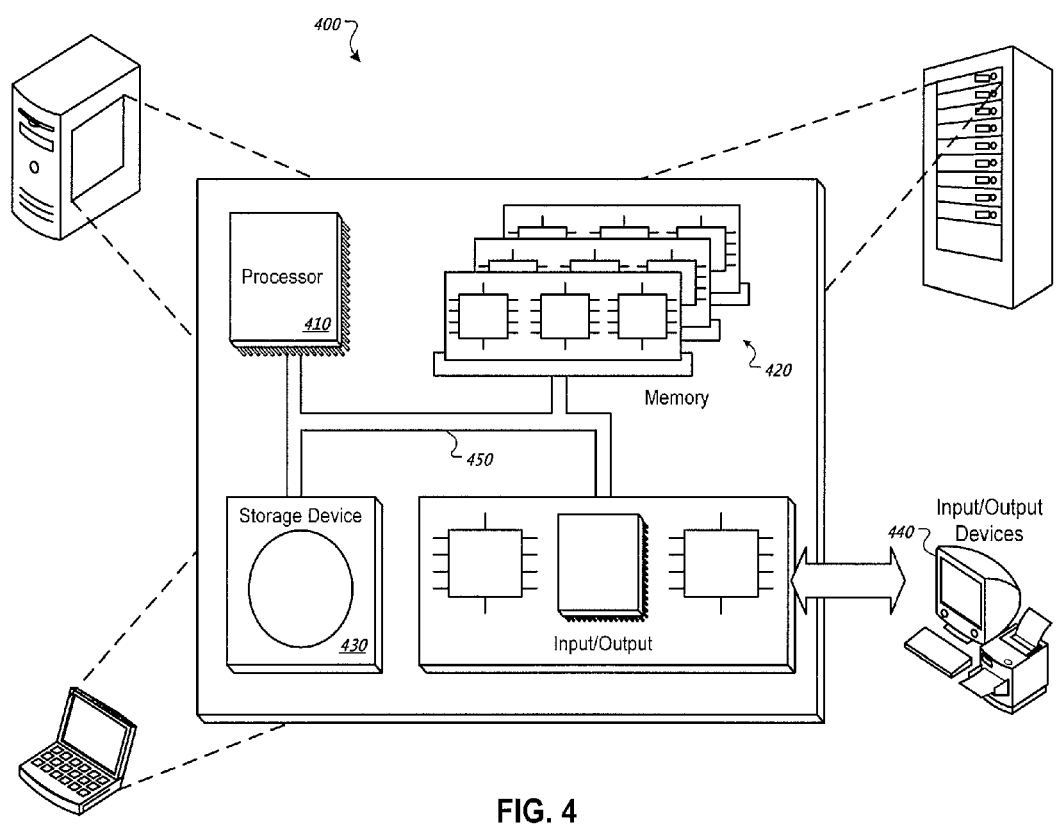
FIG. 4 is a schematic diagram of an example of a generic computer system 400.

FIG. 4 is a schematic diagram of an example of a generic computer system 400. The system 400 can be used for the operations described in association with the methods discussed above according to one implementation.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 820 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/ output device 440 includes a keyboard and/or pointing device. In another implementation, the input/output device 440 includes a display unit for displaying graphical user interfaces.

Search engines may be used to leverage the vast amount of information available to them to execute "more-like-this" image queries or "which song does this audio snippet come from" type queries as described above. Other applications include, but are not limited to, searching a personal PC for a target image, or song based on the characteristics of the incoming image or song.

In some implementations, the song snippets can be assigned target values using alternate clustering methods. For example, songs can be grouped by genre such that country songs would be grouped more closely to other country songs and grouped farther apart from hip hop songs.

In some implementations, snippets of songs can also be hashed using different techniques. For example, snippets of songs could be hashed to more than one location if the snippet or song exhibited different musical styles, such as classical music and reggae music.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

EXAMPLES

Example 1

This example was constructed to meet the goal of identifying the song from which an audio sample came, given that the audio sample was an extremely short (~1.4 second) audio "snippet" sampled from anywhere within a large data-base of songs.

A database was created using 6,500 songs, with 200 snippets extracted from each song, with a resulting total of 1,300,000 snippets. First, each song was first converted into a series of small snippets for storage in the database. Then, when a new song or snippet was looked up in the database, it was converted in the same manner.

Each song was converted from a typical audio format (i.e. mp3, way, etc.) to a mel-frequency spectrogram with tilt and amplitude normalization over a pre-selected frequency range. The frequency range may cover, for example, 400 Hz to 4 kHz or 300 Hz to 2 kHz. For computational efficiency, the input audio was low-pass filtered to about ¾ of the top of the selected frequency range and then down sampled accordingly. For example, using 4 kHz as the top of our frequency range of interest and using 44.1 kHz as the input audio sampling rate, we low-pass filtered using a simple FIR filter with an approximate frequency cut between 5 and 5.5 kHz and then subsampled to a 11.025 kHz sampling rate. To minimize volume-change effects, we normalized the audio sample energy using the local average energy, taken over a tapered, centered 10-second window. To minimize aperture artifacts, the average energy was also computed using a tapered Hamming window.

A spectrogram "slice rate" of 100 Hz (that is, a slice step size of 10 ms) was used. For the slices, audio data was taken, and a tapered window (to avoid discontinuity artifacts in the output) applied, and then an appropriately sized Fourier transform was applied. The Fourier magnitudes were "de-tilted" using a single-pole filter to reduce the effects of low-frequency bias and then "binned" (averaged) into B frequency samples at mel-scale frequency spacing (e.g., B=33).

Training commenced by selecting 10 consecutive snippets from 1024 songs, sampled 110 ms apart (for a total 10,240 snippets). Each snippet from the same song was then labeled with the same target song code for that song. This was a weak label: although the snippets that are temporally close may be 'similar', there is no guarantee that snippets that are further apart will be similar—even if they are from the same song. Moreover, snippets from different songs may have been more similar than snippets from the same song; however, we did not require detailed labeling (as it would be very difficult to obtain for large sets).

Instead of statically assigning the outputs, the target outputs were allowed to shift throughout training. After every few epochs of weight updates, the network's response to each of the training samples was measured. A success was measured if any of the snippets in the hashed bin were from the correct song. The target outputs were then dynamically reassigned by assigning the target outputs of all of the samples to the member from the series that is closest to the aggregate response of the network to each of the song's snippets.

58 different networks were trained: 2 with 5 hidden units, 2 with 7 hidden units, etc, up to 2 with 61 hidden units. Each network was then used to hash approximately 38,000 snippets (drawn from 3,800 songs with 10 snippets each). These 3,800 formed our test set for this stage, and were independent from the training set. For this test, we removed the query q from the database and determined in which bin it would hash by propagating it through the networks—if the output of the network was greater than the median response of the output (as ascertained from the training set), the output was considered as +1; otherwise, it was considered as 0. The 10 outputs were treated as a binary number representing the hash bin.

By letting the network adapt the outputs in this manner, the outputs across training examples were effectively reordered to prevent forcing artificial distinctions. Through this process, the outputs were effectively being reordered to perform a weak form of clustering of songs, as similar songs were likely to have small hamming distances in target outputs.

For comparative purposes, training was also completed without output reordering, while using the same inputs, number of epochs, etc. Training a neural network without reordering resulted in a performance that was barely above random chance (5.4 matches out of 10 when using 5 hidden units, and 5.6 out of 10 when using 59 hidden layers). In comparison, neural networks trained using reordering performed much better (6.5-7 matches out of 10 when using 5 hidden units, and 7-7.5 matches out of 10 using 59 hidden units). Thus, a network trained with output reordering was able to learn a mapping more consistently than a network trained without reordering.

Figure 6:
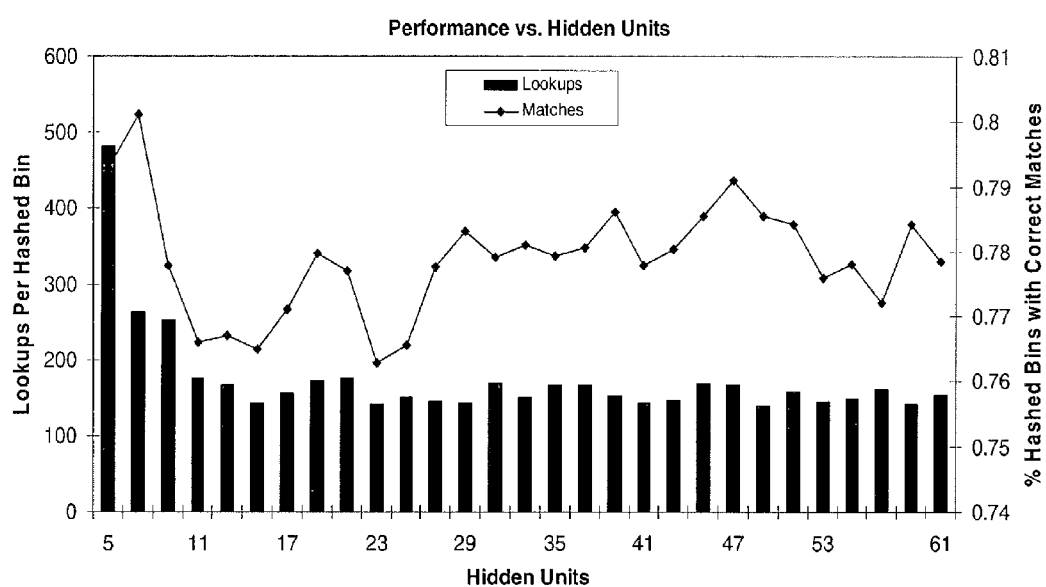
FIG. 6 shows the number of elements in the resulting bin (on average) as a function of the number of hidden units in the network.

FIG. 6 shows the number of elements in the resulting bin (on average) as a function of the number of hidden units in the network. FIG. 6 also shows the percentage of lookups that resulted in a bin which contained a snippet from the correct song. Looking at the middle of the graph, every query on average was hashed into a bin with approximately 200 other snippets (~0.5%) of the database. In ~78% of the retrievals, the hash bin contained a snippet from the correct song. Note that if the hashes were completely random, we would expect to find a snippet from the same song less than 1% of the time. FIG. 6 also shows the negative effects of small networks, which may be seen in the lower precision (higher # of lookups) and largely unchanged recall (% correct matches) given by the networks with 5-9 hidden units. However, using only networks with 11 or more hidden units reduces the number of lookups by ~70% (from ~500-~150) with only minor impact on the recall rate (~2%).

Example 2

Example 2 used the same technique described in example 1 to obtain song snippets. Example 3 described the results of changed attributes for L (1-22) and # of network outputs per hash (10-22: 1,024-4,194,304 bins per hash).

In Example 1, success was measured by whether the hashed bin contained a snippet from the correct song. Example 2 used a tightened definition of success. The snippets found in all of the L hashed bins were rank ordered according to the number of hashes that contained each snippet. Using these ranked snippets, success was determined as the correct match of the song label associated with the single top-ranked snippet and the query q.

Figure 5:
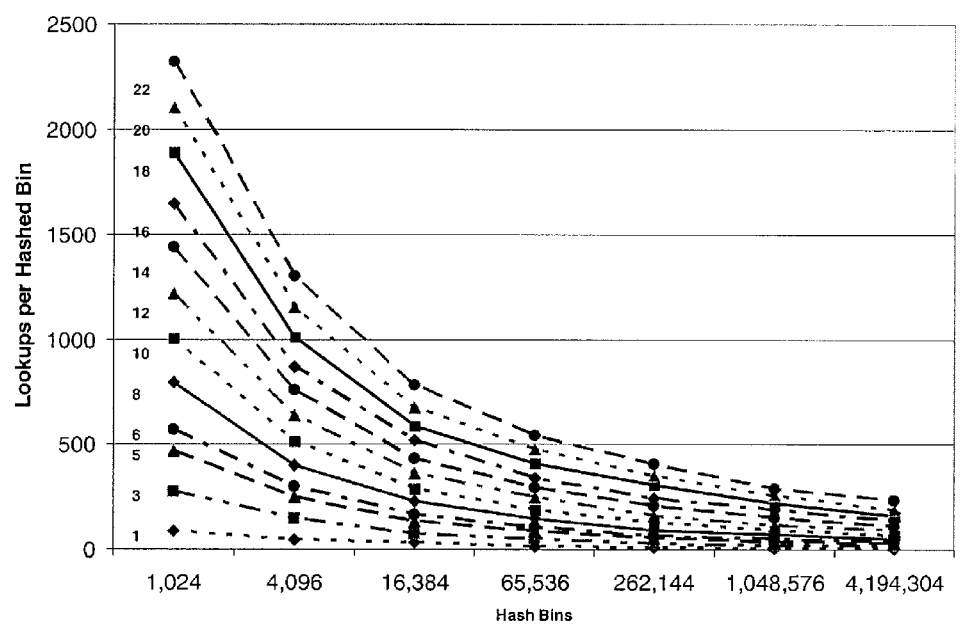
FIG. 5 is a graph showing Lookups Per Hashed Bin for Systems with L=1–22 Sets of Hashes.

FIG. 5 shows the lookups per hashed bin for a range of systems.

With L=22 hashes and with only 1,024 bins, the number of candidate lookups is unacceptably large—over 2,000. With a smaller number of hashes, the number of candidates decreases. As expected, as the number of bins increases, the number of candidates decreases rapidly for all of the settings of L considered. For 22 hashes, as the number of bins increases, the ability to find the best match barely decreases—despite the large drop in the number of lookups. For approximately 200-250 candidates (~0.6% of the database), we achieve between 80-90% accuracy (L>14).

Note that for (L=1-3), as the number of bins increases, the accuracy rises—in almost every other case it decreases. The increase with L=1-3 occurs because there are a large number of ties with a small L; many songs have the same support, and we break ties with random selection. As the number of snippets hashed to the same bin decreases, the correct song competes with fewer incorrect ties and has a higher chance of selection.

Finally, note that as the number of hashes increases, the number of candidates increases almost linearly. This indicates that the hashes are truly independent. If they were not independent, the number of unique candidates examined would overlap to a much greater degree. If there was significant repetition of candidates across the hashes, we would see the same "frequent-tie" phenomena that we commented on for L=1: the same songs would be repeatedly grouped and we would be unable to distinguish the correct co-occurrences from the accidental ones.

Example 3

A large scale test of a system was conducted using the trained networks (from Examples 1 and 2) to hash 1,300,000 snippets. 6,500 songs were selected, and 200 snippets from each song were procured. The snippets are of length 128*11 milliseconds, and are drawn approximately 110 ms apart. The spacing follows the experiments of previous studies. In Example 3, we use the same technique described in Example 1 to obtain our song snippets.

For every query snippet, the number of other snippets considered as potential matches (the union of the L hashes) were examined. In addition, the number of times the snippet with the maximum number of hits from all of the hashes came from the correct song was examined. 46 different parameter settings produced by varying L and the number of bins per hash were tried. Table 2 shows the performance for 5 groups of desired # of candidates. The rows of Table 2 indicate the desired % of candidates examined, while the rows show the achieved accuracy and associated parameter settings. For example, the first row of Table 2 (<0.15%) indicates that when the average query examined less than 0.15% of the database, the top accuracy that was achieved was 56%, and used 22 bins and L=10 sets of hashes. In summary, 1.4 second snippets could be found in a database of 6500 songs with 72% accuracy by using 22 bins and L=18 sets of hashes—while only examining 0.27% of the database per query.

TABLE 2

| | Best Results for 0.15-0.55% Candidates | | |
|---|---|---|---|
| % Candidates | Best 3 Results (Accuracy, Bins,/(sets)) | | |
| Examined | top | Second | third |
| <0.15% | 56% (22, 10) | 37% (20, 5) | 36% (22, 5) |
| 0.15-0.25% | 69% (22, 16) | 66% (22, 14) | 62% (22, 12) |
| 0.25-0.35% | 72% (22, 18) | 67% (20, 14) | 63% (20, 12) |
| 0.35-0.45% | 73% (20, 18) | 70% (20, 16) | 63% (16, 5) |
| 0.45-0.55% | 77% (20, 22) | 75% (20, 20) | 71% (18, 16) |

Figure 7:
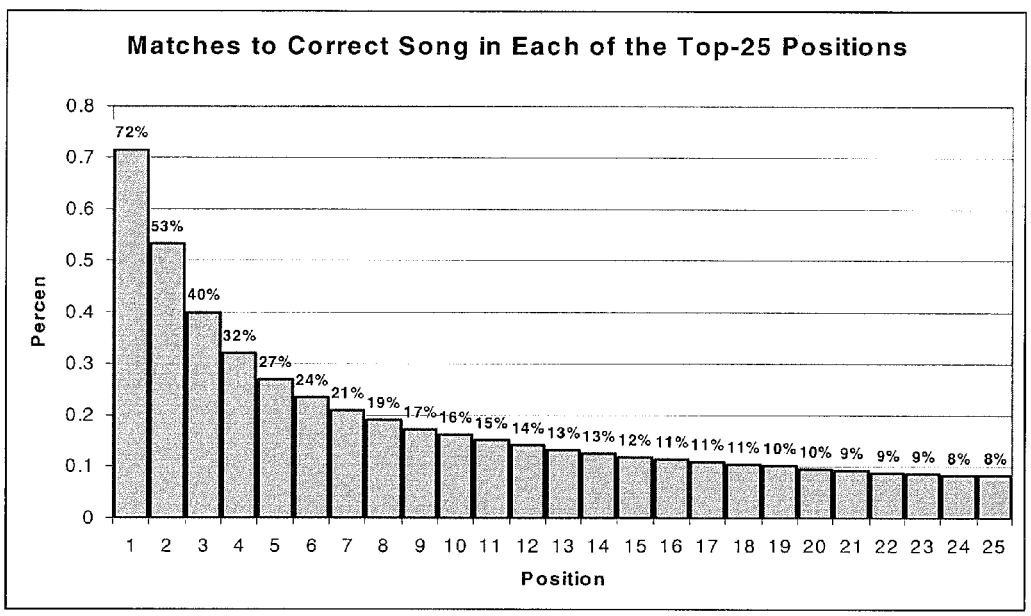
FIG. 7 demonstrates more than just the single top match entry.

FIG. 7 demonstrates more than just the single top match entry. As shown, when the top 25 snippets that appeared in the most bins are examined, there is a smooth drop-off in finding the correct song. Because there are 200 snippets from each song in the database, multiple snippets from the same song can be found.

Example 4

Finally, we bring all of our results together and examine the performance of this system. In this example, we allowed fingerprints to be coarsely sampled to lower the memory required to recognize a large database of songs and resulted in improved recognition rates. For this example, we used s seconds of a song ($1.4 \leq s \leq 25$) and integrated the evidence from individual snippet lookups to determine the correct song. By removing the matching snippet from the database, this makes the sampling rate and points substantially the worst possible for the database—the closest matching snippet is temporally 11 ms away from q. In live service, with either stochastic or aligned sampling of the query, the maximum distance will be reduced to 5.5 ms. Results are shown in Table 3. For the forgiving hasher system proposed, we give the results using $2^{22}$ bins & l=18 hashes. In summary, for our system, the near perfect accuracy at even 5s is achieved while considering only a tiny fraction of the candidates (0.027% per lookup). Also note that each candidate simply has a counter associated with it; neither the spectrogram, nor a representation of the spectrogram, is compared with each candidate.

TABLE 3

| | Performance vs. Query Length (in seconds) | | | | |
|---|---|---|---|---|---|
| | 1.4 s | 2 s | 5 s | 13 s | 25 s |
| Forgiving-Hash | 72.3% | 89.4% | 98.9% | 99.2% | 99.5% |

Particular embodiments of the subject matter described in this specification have been described. Nevertheless, it will be understood that various modifications may be made without departing from the spirit and scope of the invention. For example, the actions recited in the claims can be performed in a different order and still achieve desirable results. Other embodiments are within the scope of the following claims.

What is claimed is:

1. A system comprising:
one or more computers; and
a computer-readable medium coupled to the one or more computers having instructions stored thereon which, when executed by the one or more computers, cause the one or more computers to perform operations comprising:
  A) training a plurality of learning systems, each learning system implementing a learning function and having an input and producing an output where training includes:
    identifying a training set including target output values associated therewith;
    providing the training set to each learning system in a small number of plurality of cycles and adjusting parameters of the learning system to improve matching to the target output values;
    adjusting the target output values based on the actual output provided by the respective learning system; and
    continuing training the learning system; and
  B) initializing one or more data structures including:
    providing samples to each trained learning system;
    combining outputs of the learning systems for each sample; and
    mapping the combined outputs to one or more data structures, the combined outputs providing indices to respective samples in those data structures; and
  C) evaluating a target sample including:
    providing the target sample to each trained learning system;
    combining the outputs of the trained learning systems; and
    locating matching samples in the one or more data structures using the combined outputs of the trained learning system for the target sample.

2. The system of claim 1, wherein the samples and target sample are audio samples.

3. The system of claim 1, wherein the learning systems are neural networks.

4. A system comprising:
one or more computers; and
a computer-readable medium coupled to the one or more computers having instructions stored thereon which, when executed by the one or more computers, cause the one or more computers to perform operations comprising:
  initializing a data structure including mapping samples that are to be included as entries in the data structure to locations in the data structure using a plurality of learning systems; and
  evaluating a target sample for a best match to a sample in the data structure including using an index system created using the plurality of learning systems to locate a match in the data structure.

5. The system of claim 4, wherein the samples and target sample are audio samples.

6. The system of claim 4, wherein the learning systems are neural networks.

7. A system comprising:
one or more computers; and
a computer-readable medium coupled to the one or more computers having instructions stored thereon which, when executed by the one or more computers, cause the one or more computers to perform operations comprising:
  initializing a data structure including mapping samples that are to be included as entries in the data structure to locations in the data structure using a plurality of learning systems; and
  evaluating a target sample for a best match to the samples in the data structure including using the learning systems to locate a match in the data structure without directly comparing the target sample to the data structure sample.

8. The method of claim 7, wherein the samples and target sample are audio samples.

9. The method of claim 7, wherein the learning systems are neural networks.

10. A computer storage medium encoded with a computer program, the program comprising instructions that when executed by one or more computers cause the one or more computers to perform operations comprising:
  A) training a plurality of learning systems, each learning system implementing a learning function and having an input and producing an output where training includes:
    identifying a training set including target output values associated therewith;
    providing the training set to each learning system in a small number of plurality of cycles and adjusting parameters of the learning system to improve matching to the target output values;
    adjusting the target output values based on the actual output provided by the respective learning system; and
    continuing training the learning system; and
  B) initializing one or more data structures including:
    providing samples to each trained learning system;
    combining outputs of the learning systems for each sample; and
    mapping the combined outputs to one or more data structures, the combined outputs providing indices to respective samples in those data structures; and
  C) evaluating a target sample including:
    providing the target sample to each trained learning system;
    combining the outputs of the trained learning systems; and
    locating matching samples in the one or more data structures using the combined outputs of the trained learning system for the target sample.

11. The computer storage medium of claim 10, wherein the samples and target sample are audio samples.

12. The computer storage medium of claim 10, wherein the learning systems are neural networks.

13. A computer storage medium encoded with a computer program, the program comprising instructions that when executed by one or more computers cause the one or more computers to perform operations comprising:
  initializing a data structure including mapping samples that are to be included as entries in the data structure to locations in the data structure using a plurality of learning systems; and
  evaluating a target sample for a best match to a sample in the data structure including using an index system created using the plurality of learning systems to locate a match in the data structure.

14. The computer storage medium of claim 13, wherein the samples and target sample are audio samples.

15. The computer storage medium of claim 13, wherein the learning systems are neural networks.

16. A computer storage medium encoded with a computer program, the program comprising instructions that when executed by one or more computers cause the one or more computers to perform operations comprising:
- initializing a data structure including mapping samples that are to be included as entries in the data structure to locations in the data structure using a plurality of learning systems; and
- evaluating a target sample for a best match to the samples in the data structure including using the learning systems to locate a match in the data structure without directly comparing the target sample to the data structure sample.

17. The computer storage medium of claim 16, wherein the samples and target sample are audio samples.

18. The computer storage medium of claim 16, wherein the learning systems are neural networks.

19. A computer-implemented method comprising:
- providing, by a client machine, a target sample to one or more servers for evaluation as a best match to a sample in a data structure stored by the one or more servers, wherein evaluation as a best match comprises using an index system created using a plurality of learning systems to locate a match in the data structure, wherein samples that are included as entries in the data structure are mapped to locations in the data structure using the plurality of learning systems; and
- receiving, by the client machine, data that identifies the best match from the one or more servers.

20. The method of claim 19, wherein the samples and target sample are audio samples.

21. The method of claim 19, wherein the learning systems are neural networks.

22. A computer-implemented method comprising:
- providing, by a client machine, a target sample to one or more servers for evaluation as a best match to samples in a data structure stored by the one or more servers, wherein evaluation as a best match comprises using a plurality of learning systems to locate a match in the data structure without directly comparing the target sample to the data structure sample, wherein samples that are included as entries in the data structure are mapped to locations in the data structure using the plurality of learning systems.

23. The method of claim 22, wherein the samples and target sample are audio samples.

24. The method of claim 22, wherein the learning systems are neural networks.

* * * * *